United States Patent

Bohn et al.

[11] Patent Number: 5,882,470
[45] Date of Patent: Mar. 16, 1999

[54] DEVICE FOR PROCESSING PLY MATERIAL

[75] Inventors: Martin Bohn, Reutlingen; Wolfgang Scheller, Oberpleichfeld; Klaus Hörz, Neuffen, all of Germany

[73] Assignee: bielomatik Leuze GmbH & Co., Germany

[21] Appl. No.: 725,931

[22] Filed: Oct. 7, 1996

[30] Foreign Application Priority Data

Nov. 10, 1995 [DE] Germany ................ 195 41 977.4

[51] Int. Cl.$^6$ ................................................ B32B 31/00
[52] U.S. Cl. .................... 156/361; 156/362; 156/364; 156/378; 156/552
[58] Field of Search ................... 156/356, 357, 156/361, 362, 363, 364, 378, 379, 547, 548, 552, 578

[56] References Cited

U.S. PATENT DOCUMENTS

| | | |
|---|---|---|
| 3,522,129 | 7/1970 | Crathern, III . |
| 3,713,948 | 1/1973 | Kluger . |
| 3,897,945 | 8/1975 | Faltot et al. ................ 156/364 X |
| 4,680,080 | 7/1987 | Instance .................... 156/357 |
| 4,735,663 | 4/1988 | Hasegawa ................ 156/378 X |
| 4,795,513 | 1/1989 | Jensen, Jr. . |
| 4,912,337 | 3/1990 | Wilwerding . |
| 4,927,486 | 5/1990 | Fattal et al. .................... 156/351 |
| 5,366,581 | 11/1994 | Kuramoto et al. .......... 156/364 |
| 5,473,406 | 12/1995 | Hassall et al. ............. 156/364 X |

FOREIGN PATENT DOCUMENTS

| | | |
|---|---|---|
| 0 299 316 A2 | 7/1988 | European Pat. Off. . |
| 0 299 316 A3 | 7/1988 | European Pat. Off. . |
| 0 734 953 A1 | 3/1996 | European Pat. Off. . |
| 7105738 | 10/1971 | Germany . |
| 3138673 | 4/1982 | Germany . |
| 3736598 | 5/1989 | Germany . |
| 4016150 | 11/1991 | Germany . |
| 4424429 | 1/1996 | Germany . |
| 2098567 | 11/1982 | United Kingdom ........ 156/379 |

OTHER PUBLICATIONS

Patent Abstract of Japan, Kurokawa Yoshinori, *Label Position Checking Device*, 3 Oct. 1984.

*Primary Examiner*—James Engel
*Attorney, Agent, or Firm*—Quarles & Brady

[57] ABSTRACT

Directly following application of a label (3) to the adhesive coating (5) of a backing web (2) by rolling the affixation point (8) non-contact sensing by the sensor (31) of a detector device (30) establishes whether the adhesive coating (5) is not fully covered due to mutual misorientation. In the case of such a misorientation the backing web (2) including substantially all other means of a paper processing line are halted, as a result of which the exposed adhesive coating (5) is unable to soil any further parts of the machine.

5 Claims, 1 Drawing Sheet

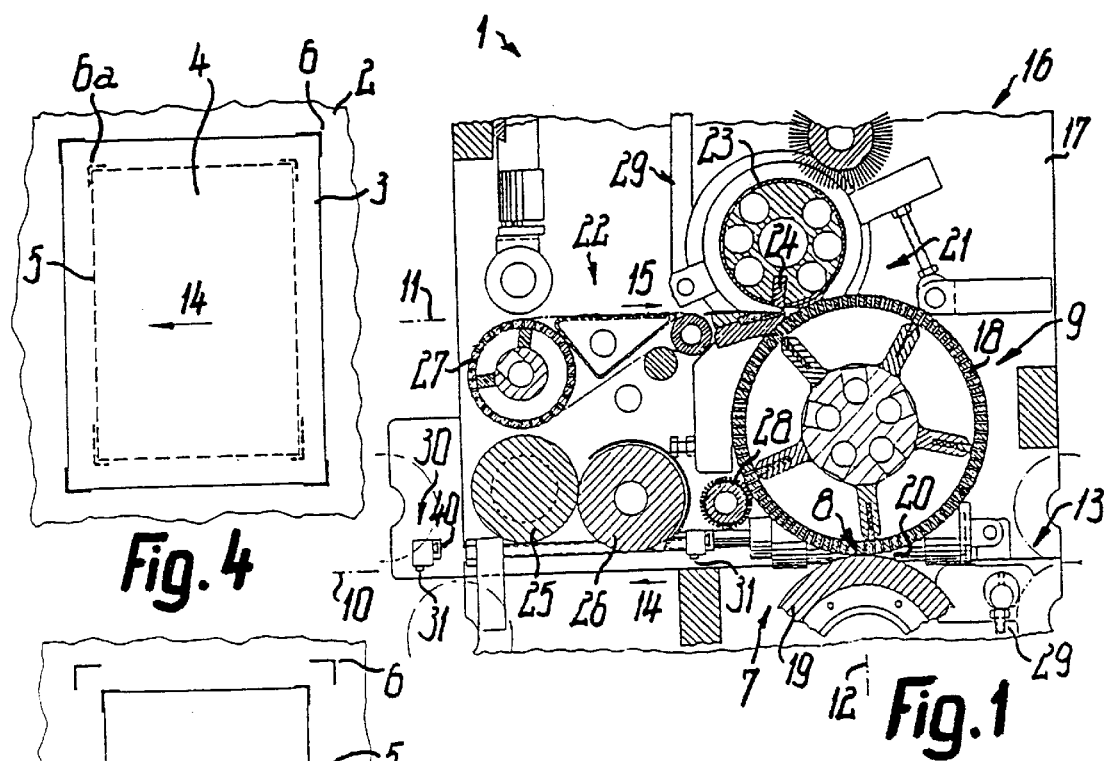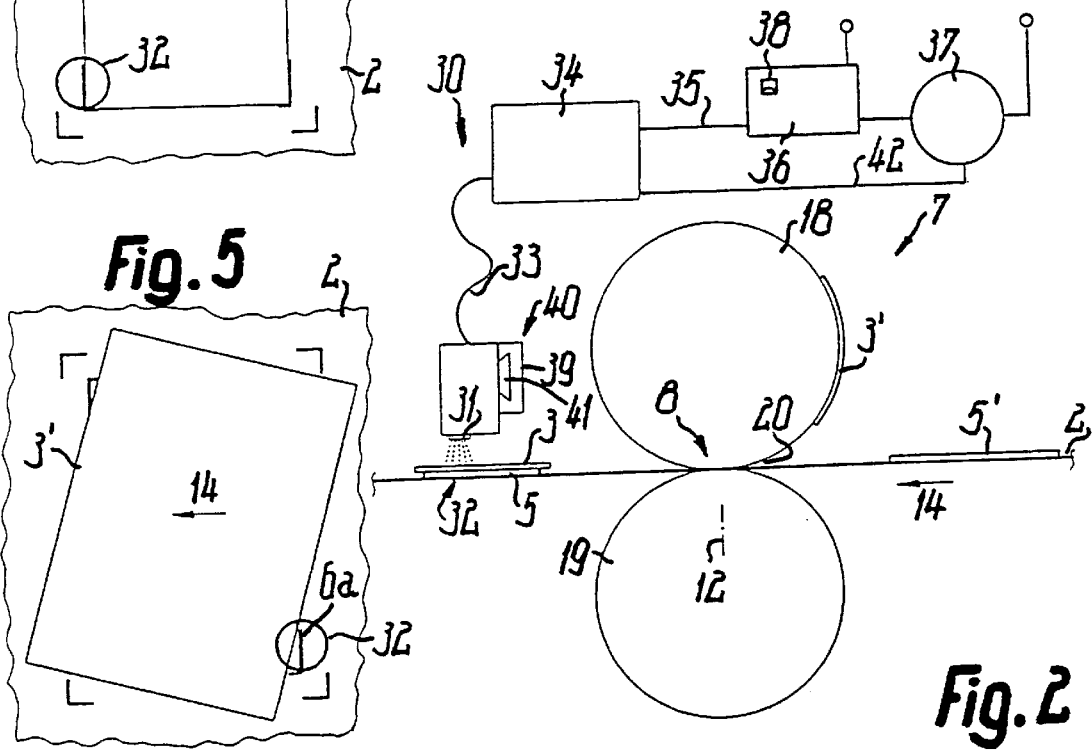

DEVICE FOR PROCESSING PLY MATERIAL

TECHNICAL FIELD AND BACKGROUND OF THE INVENTION

The invention relates to a means for processing ply material, particularly for collating, or the like, material parts of e.g. film or paper-like material correctly positioned. As a result of this, for example, one or more ply parts, such as labels, protective films or the like may be applied to on one or more backing parts of sheet material. The material part in each case may be formed by a continuous web of material or single sections, such as sheet layers and may in each case, in the running direction or crosswise thereto, be larger than the other part or the affixation field or cover field which is covered by the smaller material part after collation. The two material parts may be joined to each other bondingly or resistant to shear as well as parallel directly juxtaposed, e.g. via a film of adhesive, substantially thinner as compared thereto, which may consist of a cold or hot glue.

The invention relates in particular to a means as set forth in the German patent application P 44 24 429.0 to which reference is made in relating the configurations and effects therein to the present invention. The material parts, affixation and/or cover fields are mostly defined at right angles or full length by straight edges or margins parallel to each other. The ply parts may be supplied endlessly from a reel storage or transferred as prestamped labels to the backing part. If the backing part is an endless web or the like defined in the running direction on both sides of the affixation point of the means under tensile stress in conveyance units, then this web may be subdivided into individual sheet plies by longitudinal or transverse partings following application of the ply parts. The parting lines are predescribed with respect to the stated fields prior to or during application of the ply parts, e.g. in the form of perforations, whereby in the running direction ply parts or affixation and/or cover fields applied one after and/or juxtaposed may each have the same or different size and shape.

After collation the material parts are required to assume with respect to each other a wanted orientation within a tolerance field which e.g. with respect to an ideal orientation allows for a shift or twist in all directions of less than 1 or ½ mm. Expediently offset outwardly by more than this tolerance or more than one millimeter and less than 5 or 3 millimeters are the margins of the cover field with respect to those of the affixation field, so that the edge of the smaller material part, which as a rule is that of the ply part, slightly protrudes past the affixation or bonding field. Should e.g. due to malfunctioning of the material part feed, particularly of the ply part, an orientation materialize deviating from the wanted orientation correspondingly strongly, then the affixation surface area will not be totally covered on collation of the material parts, it instead remaining partly exposed. Such non-covered regions may result in trouble in further processing of the material parts or of the backing part in the corresponding work stations, e.g. due to it tacking to machine components.

OBJECTS OF THE INVENTION

The invention is based on the object of providing a means for processing ply material in which the disadvantages of known configurations, particularly of the kind described, are avoided. Further objects may consist of enhancing the functional reliability of the means, simplifying its operation or its control and ensuring a simple configuration.

SUMMARY OF THE INVENTION

In accordance with the invention means are provided which sense or detect whether or to what extent the material parts assume after collation the desired wanted orientation with respect to each other or which actual orientation they assume deviating from the latter. Expediently, in this arrangement a signal pulse is activated only when a misorientation exists whilst in the case of wanted orientations in keeping with requirements such a pulse is not given. The detection means may have an effect on signal or control means which e.g. alter or halt the conveyance of one or both material parts, eject the malcollated ply unit directly downstream of the affixation point, open up tight nips for passage of the material parts, cover at least the uncovered part of the bonding field with an additional ply part, actuate an audible, visual or similar indication or the like. Expediently, however, directly following sensing of a misorientation the complete means is halted, extending from a material storage for the supply of the backing web via the conveyor lane up to a collecting station for the finish-processed ply units.

Orientation may be sensed in a simple way by means of markings or markers such as e.g. register markers in visual contrast to the surface of the associated material part which in the case of the wanted orientation between the affixation sides of the material parts facing each other are covered and in the case of a misorientation are not covered and thus are sensed by a sensor of the detection means. In this arrangement the markers to be sensed may be located in the running direction at the front and/or rear end of the given cover field. Expediently the markers for determining sensing e.g. angle markers are located in the region of the corner zones of the cover field offset outwardly with respect to markers of the cited kind which determine the location of the affixation or gluing field and serve in a gluing station provided upstream of the affixation point or the affixation surface area for producing or applying the bonding coating. These affixation field markers may also be provided for sensing by the detection means.

If the material parts already assume prior to collation or affixation precise orientations with respect to separate conveyors which on the basis of their given backing material dictate one actual orientation with respect to the other following collation, then the detection means could also sense orientations already directly prior to collation and, where necessary, activate the cited subsequent effects, before the material parts have combined or the ply part and/or the cover field have attained the affixation point. The sensor, for instance an optoelectronic detector, such as a photocell, scans the backing part during passage through the system without physical contact in the region of a narrow margin parallel to the running direction. For adjusting or converting to differing relative positions, sizes or the like of the cover field the sensor is expediently configured infinitely adjustable and definable in any position with respect to a setting-up frame. The sensor may be adjustable over the working width or the width of the backing part and/or at right angles thereto in the running direction parallel in each case to the conveying plane, but also transversely thereto.

To avoid maldetection, e.g. when the material part or backing part is provided in addition to the markers outside of the cover field with other visually contrasting printed signs influencing the sensor, the sensor may be intermittingly activated and deactivated by a suitable control means, it then being able to implement sensing as cited only in the activated condition. By control means which, if required, sense the marker prior to attaining the detection point or in particular, the sensor or detection means are activated only during the time during which the section carrying the marker passes through the detection point.

These and further features are evident not only from the claims but also from the description and the drawings, each of the individual features being achieved by themselves or severally in the form of subcollations in one embodiment of the invention and in other fields and may represent advantageous aspects as well as being patentable in their own right, for which protection is sought in the present.

BRIEF DESCRIPTION OF THE DRAWINGS

Example embodiments of the invention are explained in more detail in the following and illustrated in the drawings in which:

FIG. 1 is a section view of a means in accordance with the invention shown in cross-section at right angles to the conveying plane and parallel to the running direction, FIG. 2 is a schematic illustration of a part of the means illustrated in FIG. 1, FIG. 3 is a section view of FIG. 2 in a plan view illustrated magnified FIG. 4 shows a further embodiment in a plan view of FIG. 3, and FIG. 5 is a plan view of FIG. 4, but with mutual misorientation of the material parts.

DETAILED DESCRIPTION

The means 1 serves as a preassembled unit for collating material parts, namely a backing web 2 of paper continuously conveyed under tension and a ply part 3 equal in area. The ply part 3, substantially smaller in and at right angles to the running direction as compared to the backing web 2, is required to cover a cover field 4 having the same size and shape on one side of the backing web 2 and with a spacing away from the longitudinal edges thereof. An affixation field 5 located totally within this cover field 4 and including a full-length spacing from all outer limits of the cover field 4 serves to bondingly join the two sides of the material parts 2, 3 facing each other and may be formed e.g. by a film of glue. In all four corner regions of its outer limit the cover field 4 like the affixation field 5 is marked on the corresponding surface of the backing web 2 by reference points or by marks 6, 6a. Each mark 6, 6a is angular-shaped and forms two mark arms located parallel and at right angles to the running direction. The glue film 5 may be spaced away from the corresponding markers 6a without, however, protruding therefrom outwardly into the remaining cover field 4. The edge spacing between the fields 4, 5 may be of the order of 2 mm. The required orientations of the material parts 2, 3 with respect to each other may be all of the orientations in which the field 5, as viewed from above, does not protrude past the edge of the ply part 3 or remain exposed as is also the case when no ply part 3 at all has been transferred to the backing web 2 by the means 1. All remaining actual positions or actual orientations of the ply part 3 with respect to the backing web 2, namely when the ply part 3 fails to totally cover the affixation field 5, are malpositions or misorientations to be sensed automatically in passing through the system. For this purpose at least one of the marks 6 and/or the marks 6a are arranged so that it is covered in all wanted positions of ply part 3 as shown in FIG. 4. If the ply part 3 of FIG. 4 is totally missing, this mark 6, 6a is exposed and can be sensed. If the ply part 3 is located offset transversely and/or longitudinally with respect to the field 4 or 5 and as shown in FIG. 5 twisted in area, then this mark too is exposed and this malposition can be automatically sensed.

The means 1 serves for arrangement on the upper face of a bottom or base frame onto which it is slide-mounted in place as a preassembled unit transversely to the running direction and horizontally and then locked with respect to the base frame before being joined in conclusion to the drives and control lines to become ready for operation. In this arrangement in the longitudinal direction of the bonding field several such units may be provided spaced one behind the other for differing processing operations of the backing web 2, and the backing web 2 may be maintained tensioned full-length via these units.

For placement of the ply part 3 on the backing web 2 in the region of a linear affixation point 8 the means 1 comprises an affixation station 7 and for correctly positioned transfer of the ply part 3 to the station 7 a transfer device 9. The backing web 2 runs planar extended over its width in a feed or conveying plane 10 which is horizontal at least in cross-section through the web 2 and the ply part 3 is fed to the affixation station 7 in a corresponding plane 11 located opposite the application side of the backing web 2 parallel to the plane 10 and above the latter. The backing web 2 is fed to the affixation point 8 by a conveying lane 13 beginning upstream of the means 1 and continuing downstream thereof and as of the affixation point 8 is led off together with the ply parts 3. The running direction 15 of the backing web 2 opposes the feed direction 15 of the ply parts 3 in the region of the plane 11.

The means 1 includes a frame 16, to be disposed fixedly located on the base frame, having two cheeks 17 standing off laterally from the working width of the means 1 which are connected to each other via cross struts, rotors and the like, and which may carry the bearings for the rotors located therebetween. At the outer side of one of the cheeks 17 the rotors are drivingly connected to the overall drive of the production line or to a full-length main drive shaft.

The transfer device 9 comprises a transfer rotor 18 which as a hollow suction roll accepts the ply parts 3 one after the other from the feed 22 and supplies them via a curved lane directly with the backing web 2 to the affixation point 8. Located below the rotor 18 is a counter rotor 19 rotating axially parallel thereto, the circumferential surface of which forms the counter-pressure surface for the circumference of the rotor 18 and defines therewith a nip 20 through which the material parts 2 pass. The tightest position of the feed nip 20 taper-flared to both sides forms the affixation point 8 lying in the axial plane 12 of the rotors 18, 19 at right angles to the plane 10 and 11 respectively.

The feed 22 feeds the ply parts 3 to the rotor 18 via a positioning device 21, the positioning rotor 23 of which cooperates by its circumference at the side facing away from the rotor 19 with the circumference of the rotor 19 to form a further nip. If the ply parts 3 are to be parted from a ply part web a parting device 24, e.g. a knife may be provided at the circumference of the rotor 23 directly adjacent to the rotor 18 at the end of the feed 22, this knife cooperating with a fixed counter-knife in circulation. The counter-knife forms a guidance for the ply parts 3 extending approximately up to the circumference of the rotor 18 or up to the transfer position between the rotors 18, 23. These are tangentially transferred to the rotor 18, depending on the spacing of the field 4, 5 to be covered in each case by the affixation point 8. In this arrangement the rotor 18 may rotate with a continual peripheral velocity equalling the conveying speed of the material part 2.

Between the planes 10, 11 the feed 22 contains by the interengagement of its circs a pretension rotor 25 and a counter rotor 26, the nip of which feeds the ply parts 3 contrary to the direction 14 and leads therefrom to a pretension rotor 27 driven thereabove. Along the circumference of the latter, configured the same as in the case of of the rotor 18 as a suction surface, the ply parts 3 are transferred into the plane 11, this adjoining the circumference of the rotor 18 by the slide table of the positioning device 24 roughly tangentially thereto.

In the direction of rotation immediately downstream of the affixation point 8 and upstream of the transfer zone between the rotors 18, 23 a cleaning device 28 for cleaning the circumference of the rotor 18 is provided, e.g. a roller brush extending over the working width. A corresponding roller brush or the like, likewise directly engaging the circumference may be provided for the rotor 23 to totally eliminate any adhesive remainders of the affixation field 5 in a single pass. The cited nips, particularly between the rotors 18, 19 and 18, 23 may be substantially opened up abruptly during passage in operation, by only one single rotor 19 or 23 being lifted off radially for the nip concerned, for instance by hydraulic drive.

Whether the ply part 3 in each case is disposed at all or properly in place on the corresponding cover field 4 is sensed by a detection means 30 during passage of the material parts 2, 3 in direction 14 directly downstream of the affixation point 8 and/or of the feed 22 or rotor 25 in the region of the detection points 32, this detection means being in a fixed location in operation with respect to the frame 16. In the region of each detection point a sensor is directed at the upper face of the backing web 2 facing the plane 11 which senses a mark 6a as shown positioned upstream in direction 14 in FIG. 3 and/or a mark 6a as shown positioned downstream in direction 14 in FIG. 5 when it is not covered by the ply part 3. From the sensor 31 a signal lead 33 is connected to a device 34 for signal processing and, where necessary, to the deactivating means thereof. From the ply unit 34 a signal lead 35 is connected to a cleaning device 36 which by shutting off the complete drive 37 of all means processing the backing web 2 also halts the conveying movements of the material parts 2, 3. The drive may also be a disengaging clutch or the like. For operator indication of a misorientation a display 38 is provided. A control line influenced by the drive 37 or the marks 6, 6a affects intermittent activation of the device 34.

The sensor 31 is adjustable by means of a positioner 40 parallel to plane 10 and at right angles to the direction 14 over the working width of the affixation nip 8. For this purpose the sensor 31 is shiftably mounted by a slider 41 on a rod-shaped guide 39, the latter being rigidly connecting the two cheeks 17. It is evident from FIG. 2 how in the affixation point 8 an affixation field 5- and a ply part 3-merge, the one oriented with respect to the other as required, to then be combined at the point 8 in the position as shown in FIG. 4 by being rolled together.

It is understood that all stated properties, locational requirements and effects may be provided precisely as described, merely substantially or roughly as described or also in a major departure therefrom.

What is claimed is:

1. A device for positioning and joining web or sheet members by adhesive bonding, each web or sheer member including a backing member and a web or sheet smaller than the backing member and positioned in an actual position with respect to the backing member, wherein the actual position is included in nominal orientations located within a tolerance field of nominal positions in the vicinity of a cover field of the backing member, said device comprising:

detector means for sensing the actual position of the web or sheet when said actual position extends beyond said tolerance field, said tolerance field being located within outer boundary edges of the backing member;

said detector means sensing a final nominal position of the web or sheet with respect to the backing member when the backing member is connected to the web or sheet to form a collated ply unit; and a station with a fixing point where the web or sheet members are united, wherein a conveying path determining a running direction is provided for at least one of the webs or sheets, said conveying path including a discharge path for discharging the collated ply unit away from said fixing point, said detector means defining a detection point located downstream of said fixing point, said detector means defining a detection point located downstream of said fixing point and provided for directly sensing the cover field of the backing member only when not covered by the web or sheet and while the web or sheet is adhesively united with the backing member;

wherein said detector means includes a sensor directly directed at a detection point of the backing member for sensing a reference mark provided on the backing member and covered by the web or sheet when the web or sheet is located within said tolerance field, said reference mark being not detectable by said sensor when said reference mark is covered by the web or sheet, said reference mark only being detectable by said sensor when the web or sheet extends outside said tolerance field.

2. The device according to claim 1, wherein said sensor includes a non-contact scanning detector for detecting said marks only when said marks are not covered by the layer member.

3. The device according to claim 1, wherein entirely within said cover field said backing member provides marks covered by the layer member when attached to the backing member in any of said nominal positions and uncovered when the layer member extends beyond said tolerance field but is attached to the backing member, said marks being lines and extending substantially to margin edges of the cover field.

4. A device for positioning and joining a web or sheet members by adhesive bonding, said web or sheet members including a backing member and a layer member smaller than the backing member and positioned in an actual position with respect to the backing member, wherein the actual position is included in nominal orientations located within a tolerance field of nominal positions in the vicinity of a cover field of the backing member, said device comprising:

a station with a fixing point wherein the web or sheet members are united;

detector means for sensing the actual position of the layer member when said actual position extends beyond said tolerance field, said tolerance field being located within outer boundary edges of the backing member, said detector means sensing a final nominal position of the web or sheet member with respect to the member to form a collated ply unit;

a conveying path determining a running direction for at least one of the web or sheet members, said conveying path including a discharge path for discharging the collated ply unit away from said fixing point, said detector means defining a detection point located downstream of said fixing point and provided for directly sensing the cover field of the backing member only when not covered by the web or sheet member and while the layer member is adhesively united with the backing member, the backing member including a reference mark located at boundaries of the cover field which defines an areal extension smaller than the web or sheet, and said detector means including a sensor for directly detecting the reference mark only when the reference mark is not covered by the web or sheet, because only when the web or sheet extends beyond said tolerance field can the reference mark be perceptible by said sensor.

5. A device for positioning and joining a web or sheet members by adhesive bonding, the web or sheet members including a backing member and web or sheet member smaller than the backing member and positioned in an actual position with respect to the backing member, wherein the actual position is included in nominal orientations located within a tolerance field of nominal positions in the vicinity of a cover field of the backing member, said device comprising:

a station with a fixing point wherein the web or sheet members are united; detector means for sensing the actual position of the web or sheet member when said actual position extends beyond said tolerance field, said tolerance field being located within outer boundary edges of the backing member and detector means sensing a final nominal position of the web or sheet member with respect to the backing member when the backing member is connected to the web or sheet member to form a collated ply unit, said detector means detecting only coverage of the fixing to the fixing field by the web or sheet member when the web or sheet member is fixed to the fixing field with the adhesive coating;

a conveying path determining a running direction for at least one of the web or sheet members, said conveying path including a discharge path for discharging the collated ply unit away from said fixing point, said detector means defining a detection point located downstream of said fixing point and provided for directly sensing the cover field of the backing member only when not covered by the web or sheet member and while the web or sheet member is adhesively united with the backing member, the backing member including a reference mark, a fixing field being circumferentially substantially entirely set back with respect to a peripheral boundary of the cover field, and the reference mark being provided to be detected by said detector means only when uncovered, the cover field defining a margin boundary and a cover center within said margin boundary, the reference mark being located nearer to the cover center than the margin boundary and being spacer from the margin boundary.

* * * * *